A. BECKER.
METALLIC CAR CONSTRUCTION.
APPLICATION FILED MAY 29, 1905.
974,341.
Patented Nov. 1, 1910.
6 SHEETS—SHEET 1.
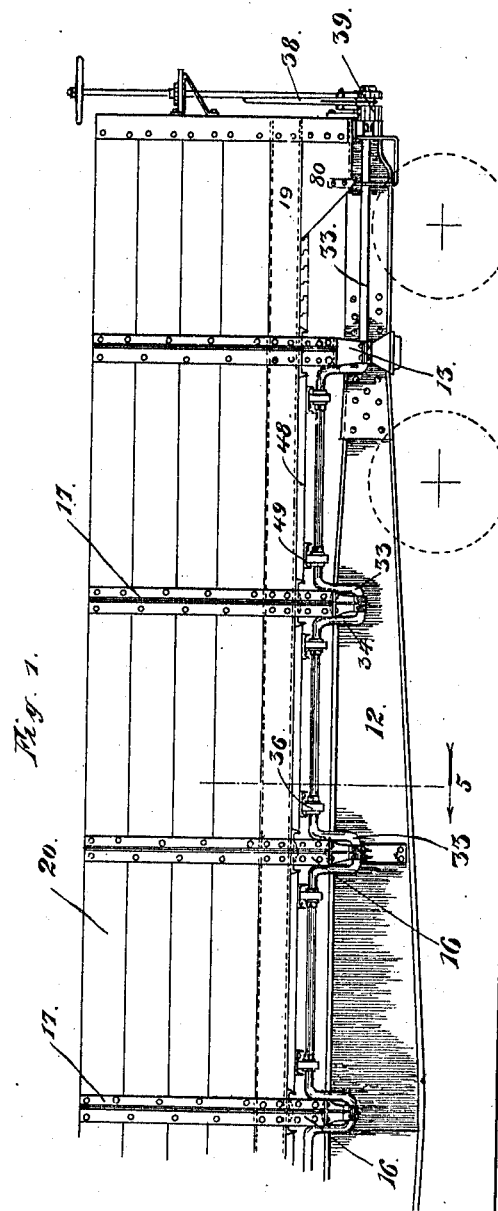
Witnesses.
Joseph S. Ralston
William W. Peet.
Inventor.
Anton Becker.
By Cheever & Cox
Attys

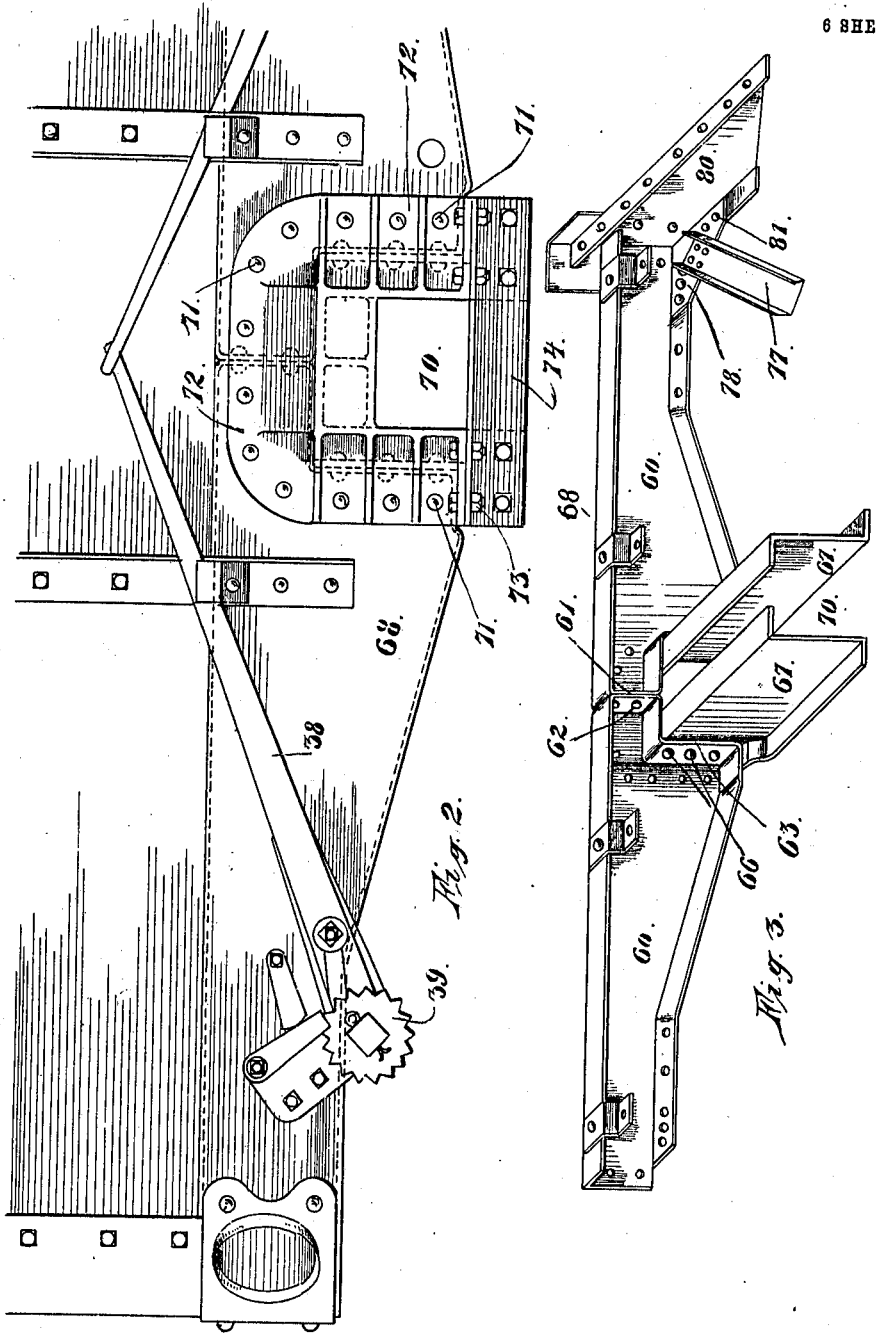

A. BECKER.
METALLIC CAR CONSTRUCTION.
APPLICATION FILED MAY 29, 1905.

974,341.

Patented Nov. 1, 1910.
6 SHEETS—SHEET 3

Witnesses.
Joseph J. Ralston
William N. Peet.

Inventor.
Anton Becker.
By Cheever & Cox
Attys.

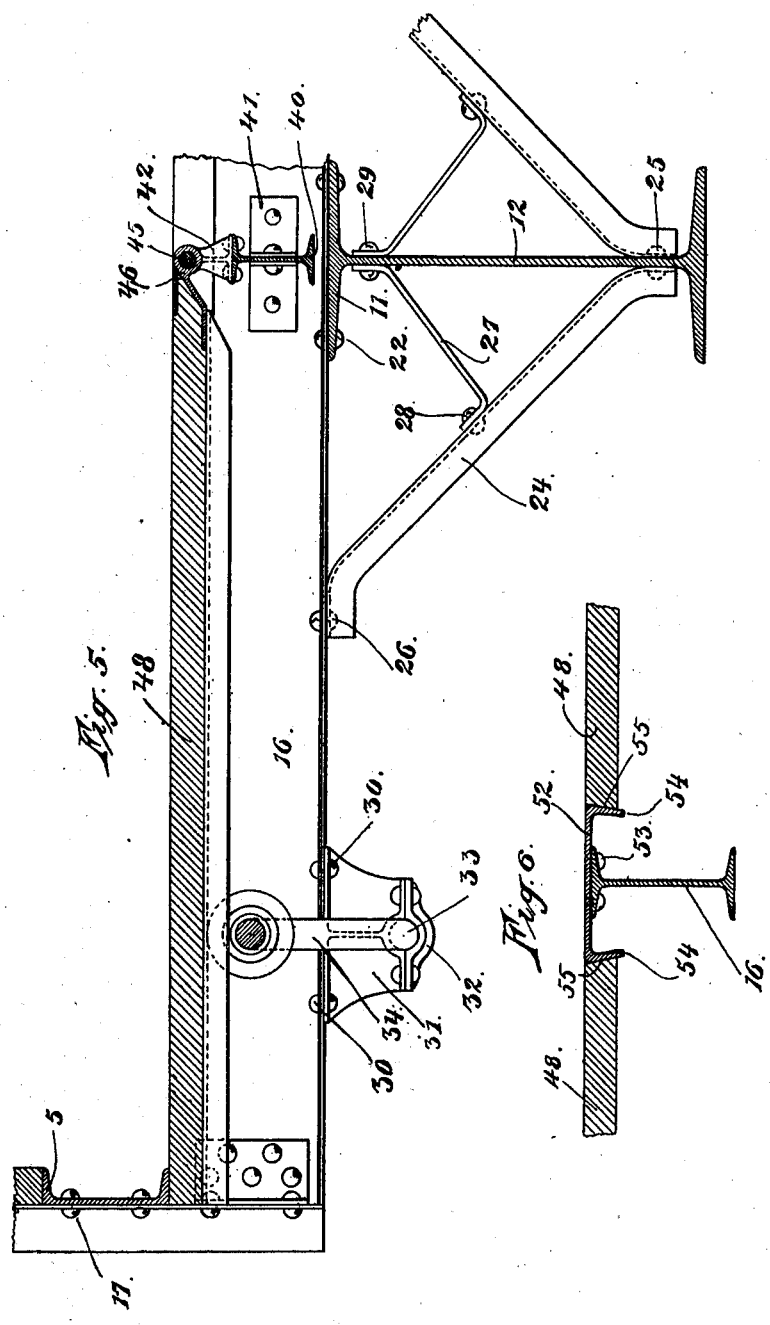

A. BECKER.
METALLIC CAR CONSTRUCTION.
APPLICATION FILED MAY 29, 1905.

974,341.

Patented Nov. 1, 1910.
6 SHEETS—SHEET 5.

WITNESSES.
Joseph S. Ralston
William W. Peet.

INVENTOR.
ANTON BECKER.
By Cheever & Cox
Attys.

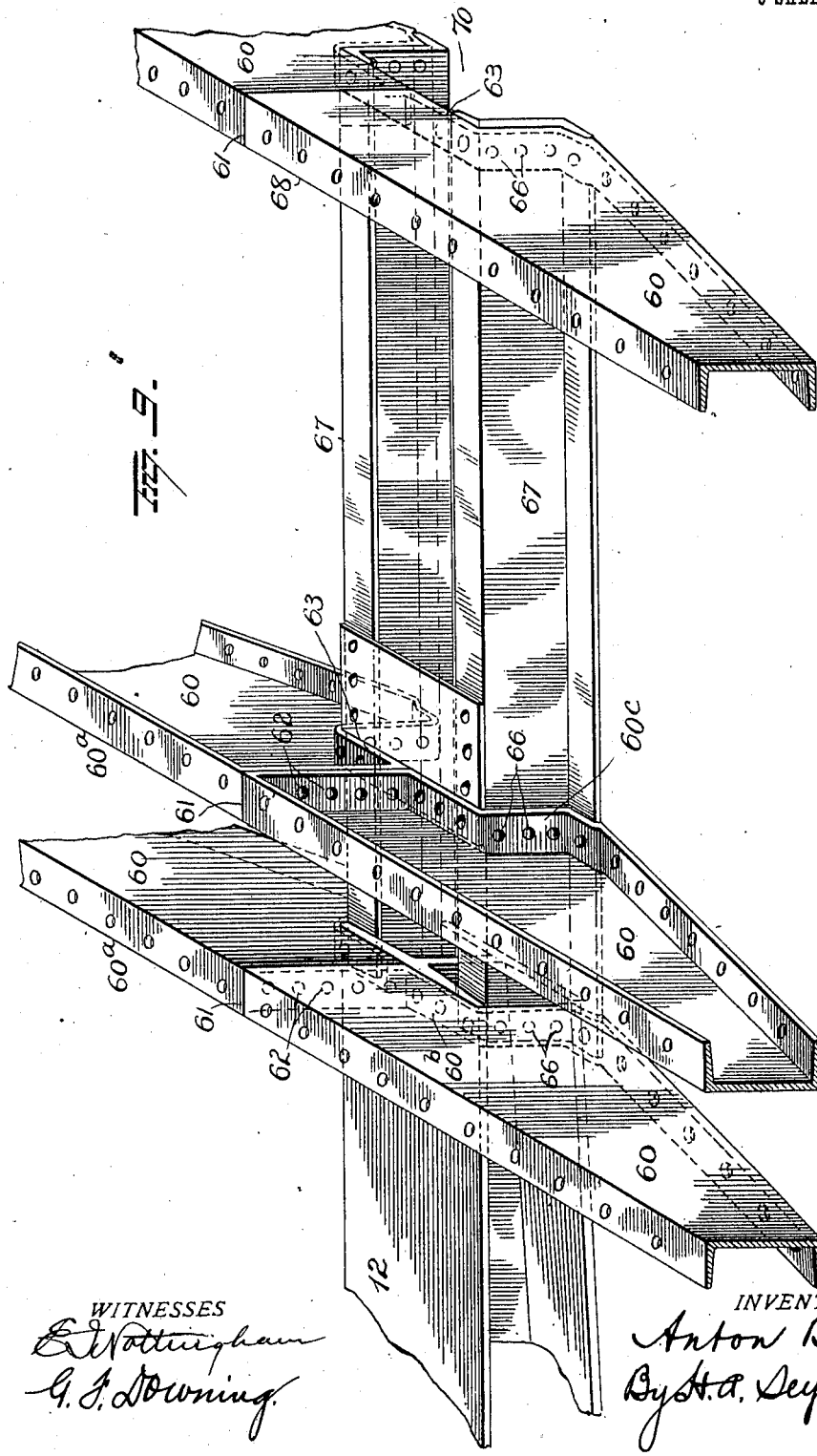

UNITED STATES PATENT OFFICE.

ANTON BECKER, OF CHICAGO, ILLINOIS, ASSIGNOR TO JOSEPH S. RALSTON, OF CHICAGO ILLINOIS.

METALLIC CAR CONSTRUCTION.

974,341.  Specification of Letters Patent.  Patented Nov. 1, 1910.

Application filed May 29, 1905. Serial No. 262,805.

*To all whom it may concern:*

Be it known that I, ANTON BECKER, a citizen of the United States, residing at Chicago, in the county of Cook and State of Illinois, have invented a certain new and useful Improvement in Metallic Car Construction, of which the following is a specification.

My invention relates to metallic car construction and is in some respects an improvement over my two prior Patents Nos. 763,841 and 763,947.

The object of my invention is to provide a car which can be very economically made of metal and which, when made, will be strong and efficient in operation and not readily liable to get out of order.

More in detail, my invention consists of a novel form of frame construction for use in cars of the type illustrated in my prior patents above referred to, in which a central girder is used in combination with normally level floor doors, pivotally mounted at the top of said girder and tilting toward the sides of the track to dump the load.

More particularly, the invention consists in a novel construction of cross-bearers for such a car capable of being used in connection with the dumping mechanism illustrated in my prior Patent No. 763,841.

My invention further consists in a novel form of bolster and center girder and in details of construction which will be hereafter more fully described and claimed as the specification proceeds.

Figure 4:
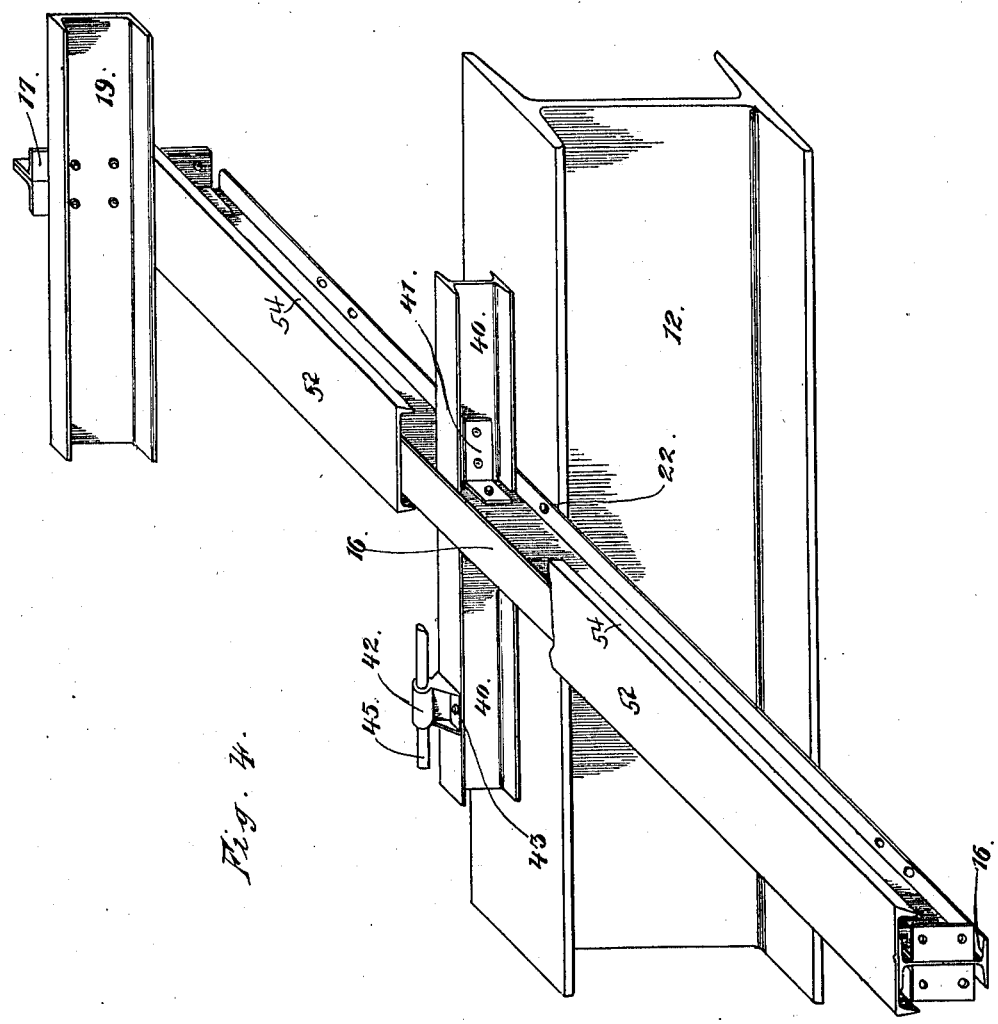
Figure 7:
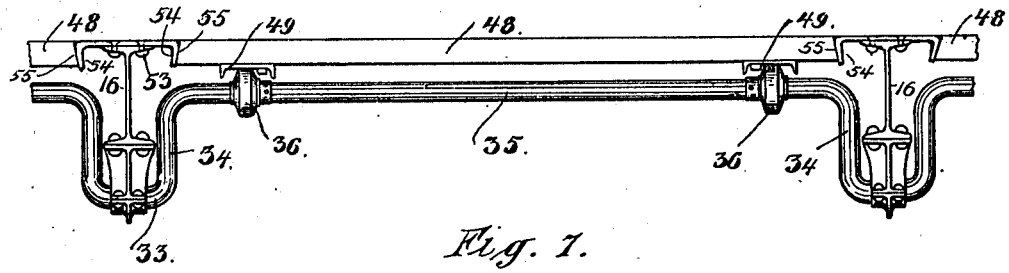
Figure 8:
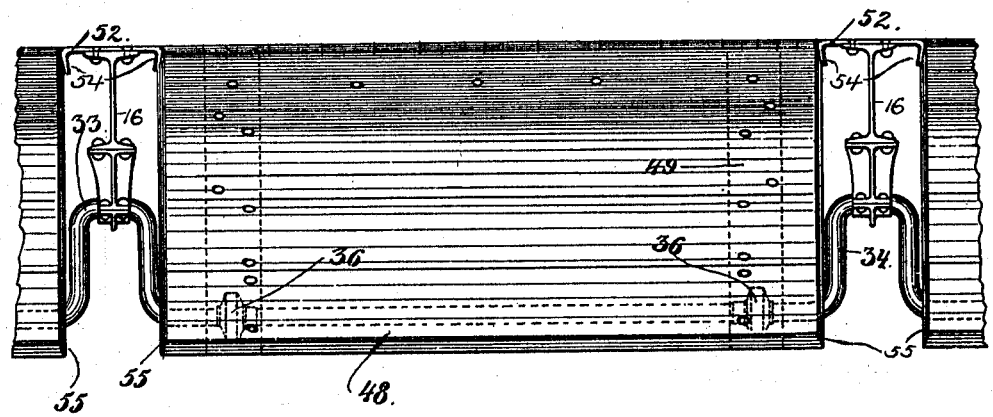

Figure 1 of the drawings is a half side elevation illustrating a car embodying my invention in its preferred form. Fig. 2 is an end view of the car showing an end-sill construction and mechanism for allowing the attachment of the draft-rigging. Fig. 3 is a detail perspective view of the construction of the end-sill shown in Fig. 2, or a bolster. Fig. 4 is a detail perspective view of the frame construction and particularly the cross-bearer construction, especially designed for use with the dumping mechanism of my prior Patent No. 763,841. Fig. 5 is a sectional detail view on line 5 of Fig. 1.
Fig. 6 is a detail side view showing the way the floor doors fit against the cross-bearer of Fig. 4. Fig. 7 is a detail side view showing the dumping shaft, the cross-bearers and floor doors, the doors being up in position for loading. Fig. 8 is the same view as Fig. 7, the doors being down in dumping position. Fig. 9 is a perspective view showing the connections between the central girder, bolster, end sill and draft bars.

As heretofore stated, the invention is designed to apply particularly to the car illustrated in my two prior patents, in which a single central girder 12, extending from bolster 13 to girder is used. This central girder may be an I-beam as shown, or it may be cast or built up of sections of metal, as desired. At right angles to this girder 12 and extending from side to side of the car, I provide a series of cross-bearers 16, consisting of I-beams, as shown in Fig. 4. I make these I-beam cross-bearers of such a size and strength that by putting posts 17 on the ends of the cross-bearers and connecting them around the box of the car with channel irons 19, as shown in Figs. 4 and 5, I obtain a sufficiently strong floor-frame to carry all of the load on the central girder 12 without its being necessary to cross brace the sideboards 20 of the car, or make them of metal. These cross-bearer I-beams 16 are secured to the top of the central girder by rivets 22, or any other suitable means. In order to brace the floor frame to the central girder, I use the diagonal braces 24, made preferably of angle or T-irons, securing one end to the central girder by the rivets 25 and the other end to the cross-bearer by the rivets 26. I also counterbrace these braces 24 with diagonal braces 27 connected to the braces 24 by the rivets 28 and to the central girder by the rivets 29. Secured by the rivets 30 to the under side of each cross-bearer 16 and in a line running the length of the car are bearing castings 31 having on their under sides caps 32. Between these bearing castings 31 and the caps 32 on the successive cross-bearers, I journal a shaft 33 having bent in it crank arms 34 on the opposite sides of each cross-bearer, the crank arms 34 adjacent to successive cross-bearers being connected by a common crank pin 35. In practice I forge this shaft and make it with the bends described, so that its total length is at least one-half the length of the car. Journaled on the crank arms 35 are rollers 36.

Successive cross-bearers 16 are connected together over the central girder 12 by I-beams 40 secured to the central girders by the angle irons 41. Secured to the tops of these longitudinal I-beams 40 are hinged castings 42 fastened in place by rivets or bolts 43. Through the hinged castings 42 and running the length of the car is a hinge rod 45 on which are journaled the hinges 46 of floor doors 48, adapted when the crank arms 35 are in their lowest position, to allow the load to slide off from the doors at the side of the track and adapted to form a level load-carrying floor when the shaft is rotated to the position shown in Fig. 7. On the under sides of these doors 48 are channel iron tracks 49, in which the rollers 36 on the crank pins 35 are adapted to bear and travel. As described in my prior Patent 763,841, the doors are operated by manipulating the lever 38 so that the shaft is turned from the position shown in Fig. 7 to that shown in Fig. 8 and back again. In the former position, the doors being level and forming the floor of the car, and in the latter position being suspended by crank pins 35 in inclined position so that the load can slide off from the doors at the side of the car. It will be readily seen from inspecting Fig. 8, that these doors 48 can, in practice, be no wider than the length of the crank pins 35, and that the length of these crank pins is necessarily determined by the width of the bearing of the shaft 33 in the casting 31 plus the thicknesses of the crank arms 34, which is no inconsiderable quantity where proper strength of the parts is maintained in a freight car of large capacity. For this reason, the I-beams 16, heretofore described, cannot without great waste of material be made of sufficient width in rolling to close up the space between the ends of successive floor doors 48 and in order to fill up this space and make a level floor without wasting material, I secure to the top of each I-beam 16 a channel iron 52, secured in position by bolts or rivets 53 and having its flanges 54 turned downward and inward toward the I-beam 16. I also make the doors 48 with bevel edges 55, corresponding to the inclination of the flanges 54 of the channels 52, as more fully appears in Figs. 6 and 7. By this construction, I maintain, as shown, when the doors are up, a substantially level floor, while allowing the doors to drop down, as shown in Fig. 8, for dumping purposes. By " channel iron " I do not limit myself to commercial rolled shapes. An ordinary iron plate bent in the form described may be used.

In order to provide for draft-rigging, I make a bolster 60$^a$, comprising two members spaced apart and each composed of two stamped or pressed pieces 60, adapted to fit together in the center line 61, and be secured together by the bolts or rivets 62, there being, however, notches 63 formed in the lower portion of each of these bolster halves 60 near the center line of the car, as shown in Fig. 2. To the sides of these notches 63, I secure by bolts or rivets 66, Z-bars 67 connecting the bolster with the end-sill 68, there being left a space 70 between the Z-bars, as shown in Fig. 2. The end-sill 68 is made as shown in Fig. 2, exactly like the bolster member 60$^a$ and the Z-bars 67 are secured to it in the same way. The forward end of the central girder 12 and the rear ends of the Z-bars 67 terminate under the flange 60$^b$ of the rear bolster member 60$^a$ and are bolted thereto. The Z-bars 67 also pass through the notches 63 of the forward bolster member 60$^a$ and are bolted to the flanges 60$^c$ of the latter. Over the end of the end-sill, I secure by bolts or rivets 71 a reinforcing casting 72, adapted to take up strain upon the end-sill and communicate it to the Z-bars 67. There is an opening 70 in this casting, through which the draft-rigging between the Z-bars 67 is adapted to extend outside of the car. The lower parts of this casting 72 are connected together by a bar or angle 74 on which the draft-rigging is adapted to rest, the same being detachably secured to the casting 72 by the bolts 73. The end-sills and the bolster and the Z-bar 67 are braced and held in position by diagonal braces 77 connected to suitable plates 78 connected to the bolster and side sill 80 by bolts or rivets 81.

I do not wish to be understood as limiting myself to exact details of construction which may be varied within reasonable limits without departing from my invention.

Having thus described my invention, what I claim as new and desire to secure by Letters Patent is—

1. In a car, the combination of a plurality of continuous cross-bearers, doors pivotally mounted between the cross-bearers to form a part of the floor of the car and to swing downward to dump at the sides of the track, and channel irons mounted on the top of the cross-bearers with their backs on the floor level and with their edges turned downward, adapted to engage the edges of the adjacent doors to form a continuous level floor.

2. In a metallic car, the combination of a plurality of continuous cross-bearers, doors pivotally mounted between the cross-bearers to form a part of the floor of the car and to swing downward to dump at the sides of the track, continuous channel irons mounted on the tops of the cross-bearers with their backs on the floor level and with their edges turned downward and inward toward the centers of the cross-bearers, said down-turned edges also fitting the corresponding bevel on the sides of the doors whereby when the doors are closed and pushed upward a tight level floor is formed, as described.

3. In a metallic car, the cross-bearer formed of a beam continuous with a wider continuous channel iron secured to its top, the edges of the channel being turned downward and inward, and a center sill below the beams as described.

4. In a car, the combination of a longitudinal girder, cross-bearers and two bolsters extending crosswise of the girder, a shaft journaled on successive cross-bearers or bolsters having crank arms adjacent to the journaled portions, and a crank pin connecting successive crank arms between successive cross-bearers or bolsters, means for revolving said shaft, doors pivoted on the longitudinal girder resting on the crank pins of the shaft between the crank arms adapted to be moved by rotating the shaft up to form a part of the level floor and down between the journals of said shaft to discharge the load at the sides of the car, and channel irons wide enough to fill the spaces between successive doors secured flanges downward on the tops of the cross-bearers, the backs of the channels being level with the floor.

5. In a car, the combination of a longitudinal girder, cross-bearers and two bolsters extending crosswise of the girder, a shaft journaled on successive cross-bearers or bolsters having crank arms adjacent to the journaled portions, and a crank pin connecting successive crank arms between successive cross-bearers or bolsters, means for revolving said shaft, doors pivoted on the longitudinal girder resting on the crank pins of the shaft between the crank arms adapted to be moved by rotating the shaft up to form a part of the level floor and down between the journals of said shaft to discharge the load at the sides of the car, and channel irons wide enough to fill the spaces between successive doors secured flanges downward on the tops of the cross-bearers, the backs of the channels forming a part of the level floor and the channel flanges being turned downward and inward to engage corresponding bevels on the edges of the doors whereby a tight floor is formed.

6. In a dump car, the combination with a center sill, the web of which is of sufficient depth and thickness to support substantially the entire load of the car, of cross bearers mounted on said sill and extending from side to side of the car, and braces extending from the center sill to the cross bearers, substantially as set forth.

7. In a dump car, the combination of a center sill adapted to support substantially the entire load of the car, cross-bearers mounted on said sill and extending from side to side of the car, and braces secured to the center sill and cross bearers, of dumping doors pivoted on supports located above the center sill, substantially as set forth.

8. In a dumping car, the combination with a single center sill consisting of a single web girder having a single web and upper and lower flanges of sufficient depth, width and strength to support substantially the entire load, of cross-bearers, and dumping doors pivotally mounted between the cross-bearers, substantially as described.

9. In a dump car, the combination with a center sill adapted to support substantially the entire load of the car, and cross bearers mounted upon said center sill and extending from side to side of the car, of I-beams having their ends supported upon and secured to the cross bearers, and dumping doors pivoted upon brackets supported on said I-beams, substantially as set forth.

10. In a dump car, the combination with a center sill consisting of a single web girder, the single web and upper and lower flanges of which are of sufficient depth and width to support substantially the entire load of the car, of continuous cross-bearers on the top of said sill and extending from side to side of the car, and dumping doors located between said cross-bearers and above the center sill, substantially as described.

11. In a metallic car, an end-section construction providing a housing for the draft-rigging consisting of an endsill and bolster having in their lower center portions inverted, U-shaped notches, as described, and Z-bars 67 secured in vertical position in said notches connecting said endsill and bolster, as described.

12. In a metallic car, an end-section construction providing a housing for the draft-rigging consisting of an endsill and bolster having in their lower center portions inverted U-shaped notches, as described, Z-bars 67 secured in vertical position in said notches connecting said endsill and bolster, as described, and a reinforcing casting 72 secured to the endsill, there being an opening 70 in the casting registering with the space between the Z-bars 67.

13. In a metallic car, the combination of an endsill or bolster composed of two flanged half portions 60 meeting each other in the center line 61 of the car, having the upper portions of their flanges secured together by bolts or rivets 62, there being in each half portion a flanged notch 63 in which Z-bars 67 extending parallel to each other and to the center line of the car are secured by rivets or corresponding means 66, substantially as described for the purposes set forth.

In witness whereof, I have hereunto subscribed my name in the presence of two witnesses.

ANTON BECKER.

Witnesses:
CAROLYN RAFTERY,
DWIGHT B. CHEEVER.